United States Patent [19]

Sheehan et al.

[11] 4,321,152

[45] Mar. 23, 1982

[54] GRINDING OF TITANIFEROUS ORES TO ENHANCE RECOVERY OF TITANIUM DIOXIDE

[75] Inventors: Gerard M. Sheehan, Savannah, Ga.; Donald E. Knapp, Linthicum, Md.

[73] Assignee: American Cyanamid Company, Stamford, Conn.

[21] Appl. No.: 199,154

[22] Filed: Oct. 21, 1980

[51] Int. Cl.[3] .......................... C09K 1/00; C01G 23/00

[52] U.S. Cl. .......................................... 252/1; 75/1 T; 241/16; 241/22; 252/383; 252/384; 423/69; 423/82; 423/268

[58] Field of Search ............... 423/82, 268, 69; 252/1, 252/383, 384, 363.5; 241/16, 22; 568/853; 75/1 T

[56] References Cited

U.S. PATENT DOCUMENTS

| | | | |
|---|---|---|---|
| 2,225,146 | 12/1940 | Bechtold | 241/16 |
| 2,437,164 | 3/1948 | Kramer | 241/16 |
| 2,822,241 | 2/1958 | Griffin et al. | 423/82 |
| 3,076,719 | 2/1963 | Whately et al. | 106/300 |
| 3,549,091 | 12/1970 | Slepetys | 241/16 |

FOREIGN PATENT DOCUMENTS

| | | | |
|---|---|---|---|
| 962003 | 2/1975 | Canada | 423/82 |

*Primary Examiner*—Herbert T. Carter
*Attorney, Agent, or Firm*—Bruce F. Jacobs

[57] ABSTRACT

Significant enhancement of titanium dioxide recovery from a titaniferous ore is achieved by improving the efficiency of the comminution of the ore with the use of polyols of the formula:

$$R-C-(R'OH)_3$$

wherein R is alkyl ($C_1$–$C_4$), or hydroxyalkyl ($C_1$–$C_4$) containing up to 3 hydroxy groups, and wherein R' is alkylene ($C_1$–$C_4$).

15 Claims, No Drawings

GRINDING OF TITANIFEROUS ORES TO ENHANCE RECOVERY OF TITANIUM DIOXIDE

This invention relates to a method for improving the grinding of titaniferous ores and increasing the amount of recovery of titanium dioxide from said ores.

The first step in the sulfuric acid process for recovery of titanium dioxide from titaniferous ores, is to grind the ore to a desired particle size. Next the ore is digested with sulfuric acid to yield a digestion cake which consists essentially of water soluble sulfates of titanium and iron, as well as minor impurities. After dissolution of the digestion cake in either water or dilute sulfuric acid, the recovery of titanium can be determined by comparing (a) the titanium assay and weight of the ore to (b) the titanium assay and volume of the resulting solution.

The sulfuric acid process for preparing titanium dioxide from titaniferous ores is conducted on a large scale and thus, even a small increase in the recovery of titanium dioxide can be commercially important. For example, for a 25 ton batch of titaniferous ore containing 64.6% titanium dioxide, a change in the titanium dioxide recovery from 84.5% to 89% represents a 29% decrease in unrecovered, or wasted titanium dioxide, and 1400 pounds extra titanium dioxide actually recovered. So, any increase in the efficiency of comminution of a titaniferous ore will result in a worthwhile saving even though the unit saving may appear small.

Canadian Pat. No. 962,003 discloses the application of propane diol to pigmentary titanium dioxide, following its preparation by either of the well known sulfuric acid or chloride processes, to improve the dispersibility characteristics of the pigment, particularly in paints; and U.S. Pat. No. 3,076,719 describes a treatment of similarly produced titanium dioxide pigment with a polyol of from 4 to 10 carbon atoms which prevents clumping during storage.

U.S. Pat. No. 2,822,241 discloses the addition of a glyceride, particularly a monoglyceride, to a titaniferous ore containing organic flotation agents to improve the digestion of the ore in sulfuric acid.

While the prior art discloses use of polyols to improve the qualities of recovered titanium dioxide and the digestion of titaniferous ores, as hereinabove described, the present invention provides as a major object a method whereby the comminution of titaniferous ores may be conducted more efficiently, with the use of certain polyols, so that the recovery of titanium dioxide from said ores upon digestion may be enhanced. Further objects and advantages of the invention will become apparent from the description of the invention which ensues.

In accordance with the objects of the present invention, it has been found that certain polyols, when added to an unground titaniferous ore, can increase the efficiency of comminution of the ore.

The polyols of the present invention have the formula:

$$R-C\text{-}(R'OH)_3$$

wherein R is alkyl ($C_1$–$C_4$), or hydroxyalkyl ($C_1$–$C_4$) containing up to 3 hydroxy groups, and wherein R' is alkylene ($c_1$–$C_4$). Preferably, R is alkyl ($c_1$–$C_3$) and R' is methylene. Most preferably, R is ethyl and R' is methylene. The polyols are preferably stable and wettable in concentrated sulfuric acid at ambient temperatures (25° C. to 35° C.), but tend to be less stable at the digestion reaction temperature. Suitable such compounds include trimethylolpropane, 1-hydroxy-2,2-dimethylolpropane; 1-hydroxy-2,2-dimethylolpentane; 1-hydroxy-3,3-diethylolpentane; 1,3-dihydroxy-2,2-diemthylolbutane, and pentaerythritol.

The polyol is added to the titaniferous ore in an amount effective to improve the comminution thereof. Generally this amount will be from about 0.005% to about 2% by weight of the ore, desirably from about 0.05% to about 1%, and preferably from about 0.07% to about 0.5%. However, more of the polyol may be added if so desired.

By the introduction of the polyol to the ore either prior to or during comminution, the comminution is rendered more efficient and the ultimate recovery of titanium dioxide from the ore, upon digestion thereof in sulfuric acid, is enhanced. The polyol appears to act as an anti-caking agent for the ore during comminution, resulting in a more rapid reduction of ore particle size. The smaller particles, in turn, are believed to be better wetted by the sulfuric acid, thereby yielding a higher recovery of titanium dioxide.

In addition to enhancing the comminution of the titaniferous ore, the continued presence of the polyol in the sulfuric acid digestion medium apparently further augments the recovery of titanium dioxide from the ore.

The following examples are provided for illustrative purposes and may include particular features of the invention. However, the examples should not be construed as limiting the invention, many variations of which are possible without departing from the spirit or scope thereof. All parts and percentages are by weight unless otherwise noted.

EXAMPLE 1

In this example, the effectiveness of trimethylolpropane (TMP), corresponding to the above polyol formula wherein R is ethyl and R' is methylene, as a grinding aid in the size reduction of a Florida ore from a deposit in Green Cove Springs is shown.

A typical chemical assay of this Florida ore, which is weathered beach sand, reveals that the titanium dioxide content thereof is 64.6%.

A 1500 g. sample of the ore was first dried at 110° C. to less than 0.2% water and then placed in a gallon ball jar containing 7500 g. of 1 inch steel balls. The ball jar was rotated at 53 rpm for the lengths of time shown in Table I below. At the conclusion of the selected grind times, the ball jar was emptied and the ore particle size determined on a 100 g. sample by sifting in a Tyler Ro-Tap through a bank of sieves ranging from 100 to 325 mesh (Tyler-U.S. Standard) for 30 minutes.

Table 1 demonstrates that for grind times of 30 minutes and 360 minutes, more -325 mesh particles were produced when TMP in an amount of 0.1% was added to the ore. For this procedure, regular commercially used steel balls, which were not polished, were employed.

TABLE I

| | Unground Ore | Control No Additive | 0.1% TMP Added | Control No Additive | 0.1% TMP Added |
|---|---|---|---|---|---|
| Grind Time | None | 30 min. | 30 min. | 360 min. | 360 min. |
| % +60 mesh | 0.04 | — | — | — | — |
| % +100 mesh | 2.39 | 1.5 | 1.6 | 0.10 | — |
| % +150 mesh | 69.02 | 37.0 | 38.12 | 0.20 | 0.10 |

TABLE I-continued

| | Un-ground Ore | Control No Additive | 0.1% TMP Added | Control No Additive | 0.1% TMP Added |
|---|---|---|---|---|---|
| % +200 mesh | 27.07 | 41.4 | 41.02 | 2.0 | 0.30 |
| % +325 mesh | 1.32 | 12.6 | 9.98 | 16.4 | 5.4 |
| % −325 mesh | 0.16 7.6 | 9.28 | 81.3 | 94.2 | |

EXAMPLE 2

This example shows the improvement in titanium dioxide recovery when a titaniferous ore which was ground using a polyol as a grinding aid is digested with sulfuric acid.

The method used in this example closely approximates the industrial digestion process, so the results received here are representative of results which would be expected on an industrial scale.

Specifically, four separate 1000 g. samples of the titaniferous ore comminuted for equal times as in Example 1, two samples with, and two samples without, the addition of 0.1% TMP, were wetted with 98% sulfuric acid for 30 minutes. Each mixture of ore and sulfuric acid was then heated to 115° C. over periods ranging from 19 to 31 minutes, while 60 ml. of water was added to simulate the dilution which occurs in the industrial process when high pressure steam (40 psig) is introduced into the mixture. End liquor, i.e., the mother liquor which remains after the titaniferous liquor is hydrolyzed to yield titanium dioxide, was then added to achieve the desired ratio of sulfuric acid to basic oxides in the ore. The end liquor contained about 20% sulfuric acid, and a sufficient quantity was added so that after the valences of all other recoverable sulfatable ore components had been satisfied, there remained enough sulfuric acid to satisfy between 65 and 80% of the titanium valences with sulfate ions. The samples were digested in the acid solution at temperatures of about 180°-190° C. for about 2½ hours. Thereupon, the resulting digestion cakes were dissolved in water to form a titaniferous liqour which was analyzed for titanium dioxide content, and the results compared with the analysis of the original ore, to determine the titanium dioxide recovery. The determination of recovery can be made using any well known method, e.g., reduction of the titanium (IV) to titanium (III) with zinc amalgam and titration of the reduced titanium with ferric ammonium sulfate to a thiocyanate end-point.

It was found upon analysis that the average recovery of titanium dioxide from the two samples which had been comminuted with trimethylolpropane was 86.5%. For the two samples comminuted without the use of trimethylolpropane, the average recovery was only 80%.

EXAMPLE 3

The procedure of Example 1 is repeated, except that the trimethylolpropane is replaced by an equal weight amount of 1-hydroxy-2,2-dimethylolpropane; 1-hydroxy-2,2-dimethylolpentane; 1-hydroxy-3,3-diethylolpentane; 1,3-di-hydroxy-2,2-dimethylolbutane, and pentaerythritol.

Similar improved comminution of the ore is observed.

EXAMPLE 4

The procedure of Example 1 is repeated, except that trimethylolpropane in amounts equal to 0.005%, 0.05%, 0.5%, 1% and 2% is added to the ore.

Similar improved comminution of the ore is observed.

What is claimed is:

1. A composition which comprises a titaniferous ore and a polyol of the formula:

$$R-C-(R'OH)_3$$

wherein R is alkyl ($C_1$-$C_4$), or hydroxyalkyl ($C_1$-$C_4$) having up to three hydroxy groups, and wherein R' is alkylene ($C_1$-$C_4$).

2. The composition of claim 1 wherein R is alkyl ($C_1$-$C_4$) and R' is methylene.

3. The composition of claim 1 wherein the polyol is trimethylolpropane.

4. The composition of claim 1 wherein the polyol is present in an amount effective to reduce the particle size of the ore as a result of comminution.

5. The composition of claim 1 wherein the polyol is present in an amount equal to from about 0.005% to about 2% by weight of the ore.

6. The composition of claim 1 wherein the polyol is present in an amount equal to from about 0.05% to about 1% by weight of the ore.

7. The composition of claim 1 wherein the polyol is present in an amount equal to from about 0.07% to about 0.5% by weight of the ore.

8. The composition of claim 1 wherein the polyol is trimethylolpropane and it is present in an amount equal to 0.1% by weight of the ore.

9. A method for improving the comminution of a titaniferous ore which comprises adding to said ore a polyol having the formula:

$$R-C-(R'OH)_3$$

wherein R is alkyl ($C_1$-$C_4$) or hydroxyalkyl ($C_1$-$C_4$) containing up to three hydroxy groups and wherein R' is alkylene ($C_1$-$C_4$), in an amount effective to reduce the particle size of the ore as a result of the comminution.

10. The method of claim 9 wherein R of the formula $R-(C-R'OH)_3$ is alkyl ($C_1$-$C_4$) and R' of said formula is methylene.

11. The method of claim 9 wherein the polyol is trimethylolpropane.

12. The method of claim 9 wherein the polyol is present in an amount equal to from about 0.005% to about 2% by weight of the ore.

13. The method of claim 9 wherein the polyol is present in an amount equal to from about 0.05% to about 1% by weight of the ore.

14. The method of claim 9 wherein the polyol is present in an amount equal to from about 0.07% to about 0.5% by weight of the ore.

15. The method of claim 9 wherein the polyol is trimethylolpropane and it is present in an amount equal to 0.1% by weight of the ore.

* * * * *